United States Patent
Hrabak et al.

(10) Patent No.: US 10,264,399 B2
(45) Date of Patent: Apr. 16, 2019

(54) LOCATION-BASED VEHICLE WIRELESS COMMUNICATIONS

(71) Applicant: GM GLOBAL TECHNOLOGY OPERATIONS LLC, Detroit, MI (US)

(72) Inventors: Robert A. Hrabak, Birmingham, MI (US); John Sergakis, Bloomfield Hills, MI (US); Nadav Lavi, Ramat-Hasharon (IL); Thomas M. Forest, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/693,559

(22) Filed: Sep. 1, 2017

(65) Prior Publication Data
US 2019/0075423 A1    Mar. 7, 2019

(51) Int. Cl.
| | |
|---|---|
| H04W 4/80 | (2018.01) |
| H04W 4/02 | (2018.01) |
| H04W 4/04 | (2009.01) |
| H04W 8/00 | (2009.01) |
| H04W 76/14 | (2018.01) |
| H04L 29/12 | (2006.01) |

(52) U.S. Cl.
CPC ........... *H04W 4/023* (2013.01); *H04W 4/046* (2013.01); *H04W 4/80* (2018.02); *H04W 8/005* (2013.01); *H04W 76/14* (2018.02); *H04L 61/1511* (2013.01)

(58) Field of Classification Search
CPC ....... H04W 4/023; H04W 76/14; H04W 4/80; H04W 8/005; H04W 4/046; H04L 61/1511
See application file for complete search history.

(56) References Cited

U.S. PATENT DOCUMENTS

| | | | |
|---|---|---|---|
| 2008/0077310 A1* | 3/2008 | Murlidar | G08G 1/0962 701/117 |
| 2018/0014341 A1* | 1/2018 | Jung | H04W 8/005 |

\* cited by examiner

*Primary Examiner* — Chuong A Ngo
(74) *Attorney, Agent, or Firm* — Reising Ethington P.C.; David Willoughby

(57) ABSTRACT

A system and method of wireless communication between a location-based wireless communications device and a vehicle, the method including the steps of: detecting when the vehicle is within an operating range of the location-based wireless communications device; establishing a short-range wireless communication (SRWC) connection between the location-based wireless communications device and the vehicle, wherein the SRWC connection is carried out over at least a first frequency band that enables a multi-Gbps data transfer rate; and transferring data between the location-based wireless communications device and the vehicle over the SRWC connection.

24 Claims, 5 Drawing Sheets

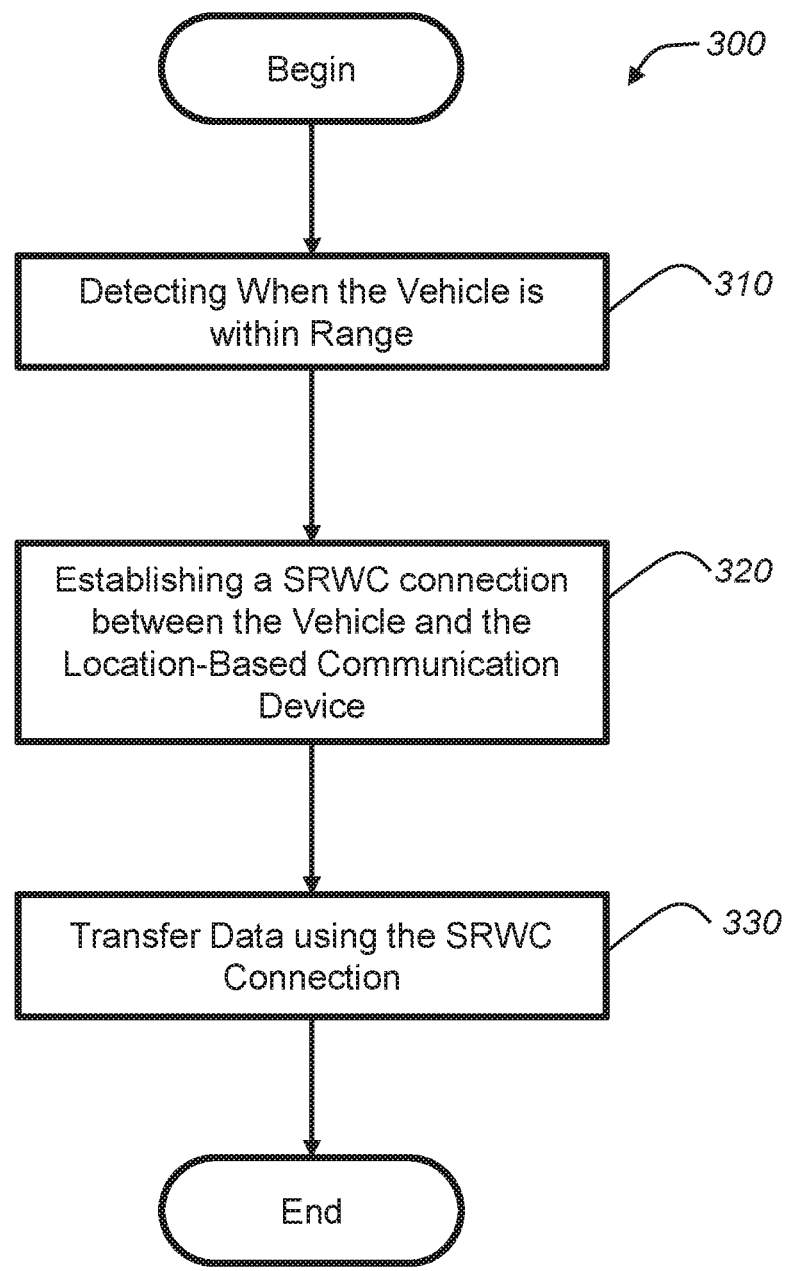

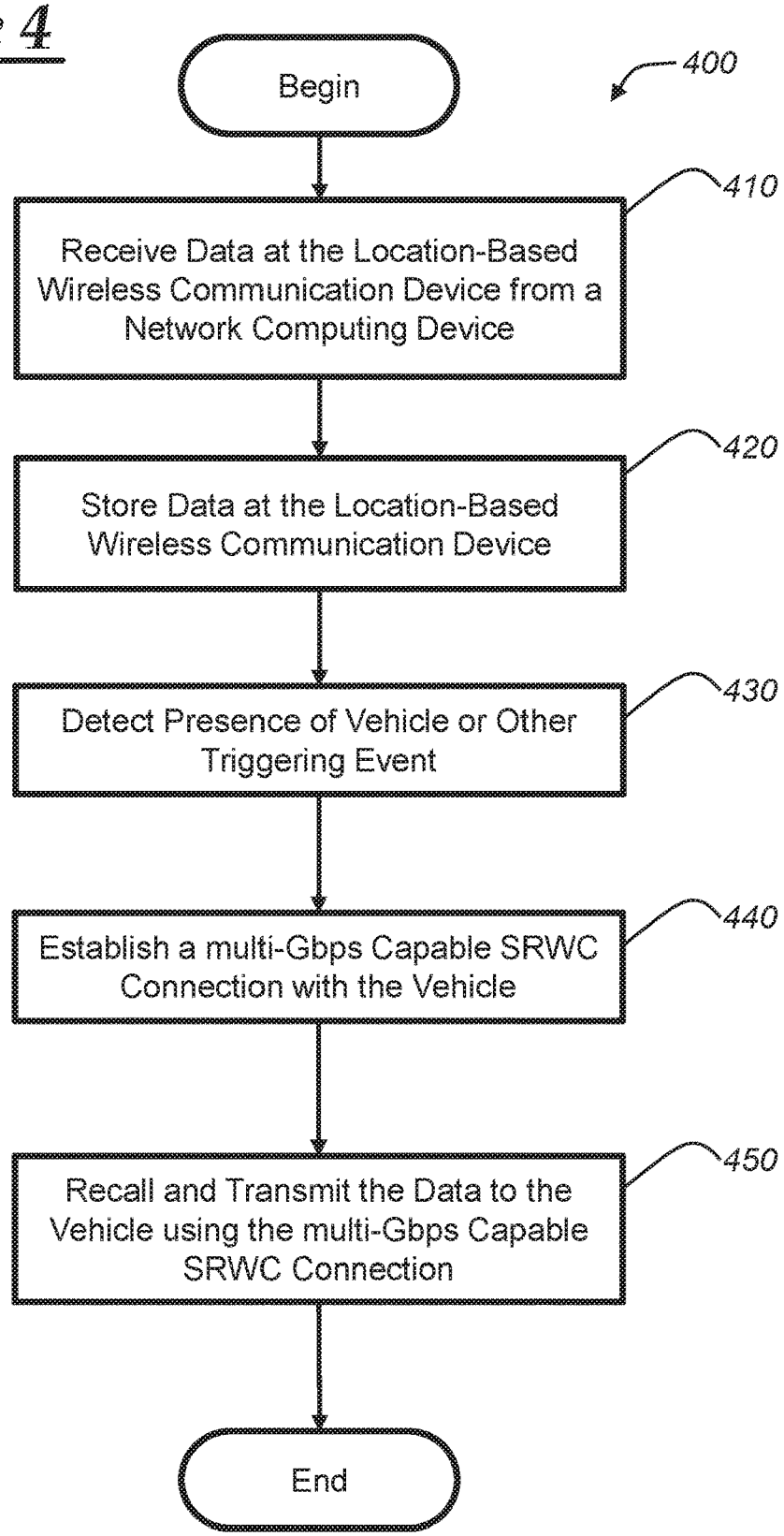

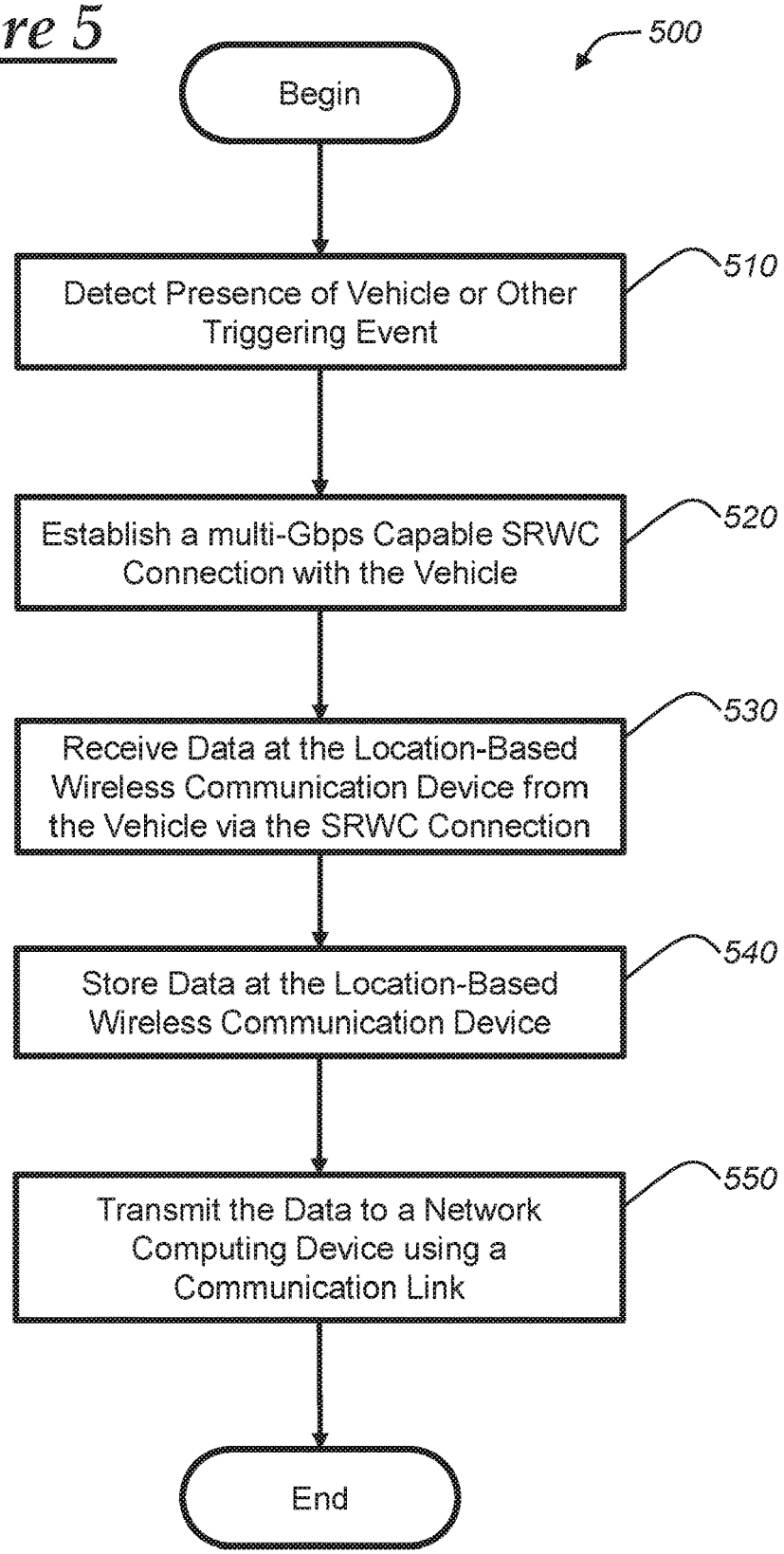

LOCATION-BASED VEHICLE WIRELESS COMMUNICATIONS

INTRODUCTION

The disclosure generally relates to vehicle communications systems, and more particularly, to systems and method for transferring data between a location-based wireless communications device and a vehicle using short-range wireless communications.

Many vehicles are now equipped with electronic configured to carry out various network communications. For example, many vehicles can transmit voice and data communications over both a short-range wireless network, such as Wi-Fi™, and a cellular network, such as GPRS or CDMA. Many of these vehicle electronics are configured to send or receive data to and/or from a remote server, such as a vehicle backend service facility, or to other wireless communications devices. These wireless devices may connect to a vehicle via short-range wireless communications (SRWC). Due to an increasing amount of traffic on these networks and the high cost of transmission, it may be desirable for a vehicle to selectively transmit or receive data to and/or from wireless communications devices that are capable of implementing a wireless protocol using a high data transfer rate.

SUMMARY

According to an embodiment, there is provided a method of wireless communication between a location-based wireless communications device and a vehicle, the method including the steps of: detecting when the vehicle is within an operating range of the location-based wireless communications device; establishing a short-range wireless communication (SRWC) connection between the location-based wireless communications device and the vehicle, wherein the SRWC connection is carried out over at least a first frequency band that enables a multi-Gbps data transfer rate; and transferring data between the location-based wireless communications device and the vehicle over the SRWC connection.

According to other embodiments, there is provided that of the first embodiment further including any one or more of the following:
- the step of communicating the data between the location-based wireless communications device and a network computing device over a communication link, wherein the communication link is configured to operate over at least a second frequency band;
- wherein the communicating step includes receiving the data at the location-based wireless communications device from a remote server via the network computing device using the communication link;
- wherein the transferring step is carried out after the data is received at the location-based wireless communications device and after the vehicle is detected to be within an operating of the location-based wireless communications device;
- the step of storing the data at a memory device included in the location-based wireless communications device after the data is received from the remote server via the network computing device;
- wherein the transferring step includes: recalling the data from the memory device included in the location-based wireless communications device; and sending the data to the vehicle using the SRWC connection;
- wherein the data is an over-the-air (OTA) update for a vehicle system module or media content that is to be presented at one or more vehicle-user interfaces;
- wherein the communication link uses short-range wireless communications (SRWC);
- wherein the communication link uses a wired communication link;
- wherein the transmitting step includes sending the data from the location-based wireless communications device to the network computing device using the communication link;
- wherein the transferring step includes receiving the data at the location-based wireless communications device from the vehicle via the SRWC connection;
- further comprising the step of storing the data in a memory device of the location-based wireless communications device;
- wherein the network computing device is a network access device, and wherein the network access device is configured to send the data to a remote server;
- wherein the data is included in a remote server message, wherein the remote server message includes an Internet Protocol (IP) address or a domain name of the remote server, wherein the domain name is resolvable to an IP address by a domain name system (DNS) server;
- wherein the network computing device is a smart television, a dongle, a desktop computer, a laptop computer, a smartphone, or a tablet;
- wherein the data indicates a presence of the vehicle at a location that includes the location-based wireless communications device;
- wherein the remote server is configured to send a message to a network computing device associated with a user of the vehicle when the vehicle is no longer detected to be within the operating range of the location-based wireless communications device;
- wherein the network computing device associated with the user of the vehicle is a smart television, a dongle, a desktop computer, a laptop computer, a smartphone, or a tablet;
- wherein the first frequency band includes one or more wireless communication channels, wherein each of the one or more wireless communication channels includes a center frequency between 35 GHz and 100 GHz;
- wherein the first frequency band includes IEEE 802.11ad, IEEE 802.11aj, IEEE 802.11ay, or IEEE 802.11az;
- further comprising the step of receiving the data at the location-based wireless communications device from at least one camera, wherein the at least one camera is connected to the location-based wireless communications device using a communication link that operates over at least a second frequency band; and
- wherein the detecting step includes receiving a short-range wireless communication (SRWC) signal from a vehicle communications module installed on the vehicle.

According to another embodiment, there is provided a method of wireless communication between a location-based wireless communications device and a vehicle, the method including the steps of: establishing a first short-range wireless communication (SRWC) connection between the location-based wireless communications device and the vehicle, wherein the first SRWC connection is configured to operate over at least a first frequency band that enables a multi-Gbps data transfer rate; and transferring data between the location-based wireless communications device and the vehicle over the first SRWC connection upon detection of a triggering event, wherein the triggering event is associated with one or more vehicle functions that includes the transfer of data between the location-based wireless communications device and the vehicle.

According to another embodiment, there is provided a system for wireless communication to a vehicle, the system including: a location-based wireless communications device configured to: detect when the vehicle is within an operating range of the location-based wireless communications device; establish a first short range wireless communication (SRWC) communication link to the vehicle, wherein the first SRWC communication link is configured to operate over at least a first frequency band that enables a multi-Gbps data transfer rate; and transfer data over the first SRWC communication link.

BRIEF DESCRIPTION OF THE DRAWINGS

Exemplary embodiments will hereinafter be described in conjunction with the appended drawings, wherein like designations denote like elements, and wherein:

FIG. 3 is a flowchart illustrating a method of wireless communication between a location-based wireless communications device and a vehicle;

FIG. 4 is a flowchart illustrating a method of wireless communication between a location-based wireless communications device and a vehicle; and FIG. 5 is a flowchart illustrating a method of wireless communication between a location-based wireless communications device and a vehicle.

DETAILED DESCRIPTION

The system and method described below enable data communications between a vehicle and a location-based communications device, wherein the data is selectively transferred at a multi-Gbps transfer rate using, for example, the IEEE 802.11ad protocol.

Figure 1:
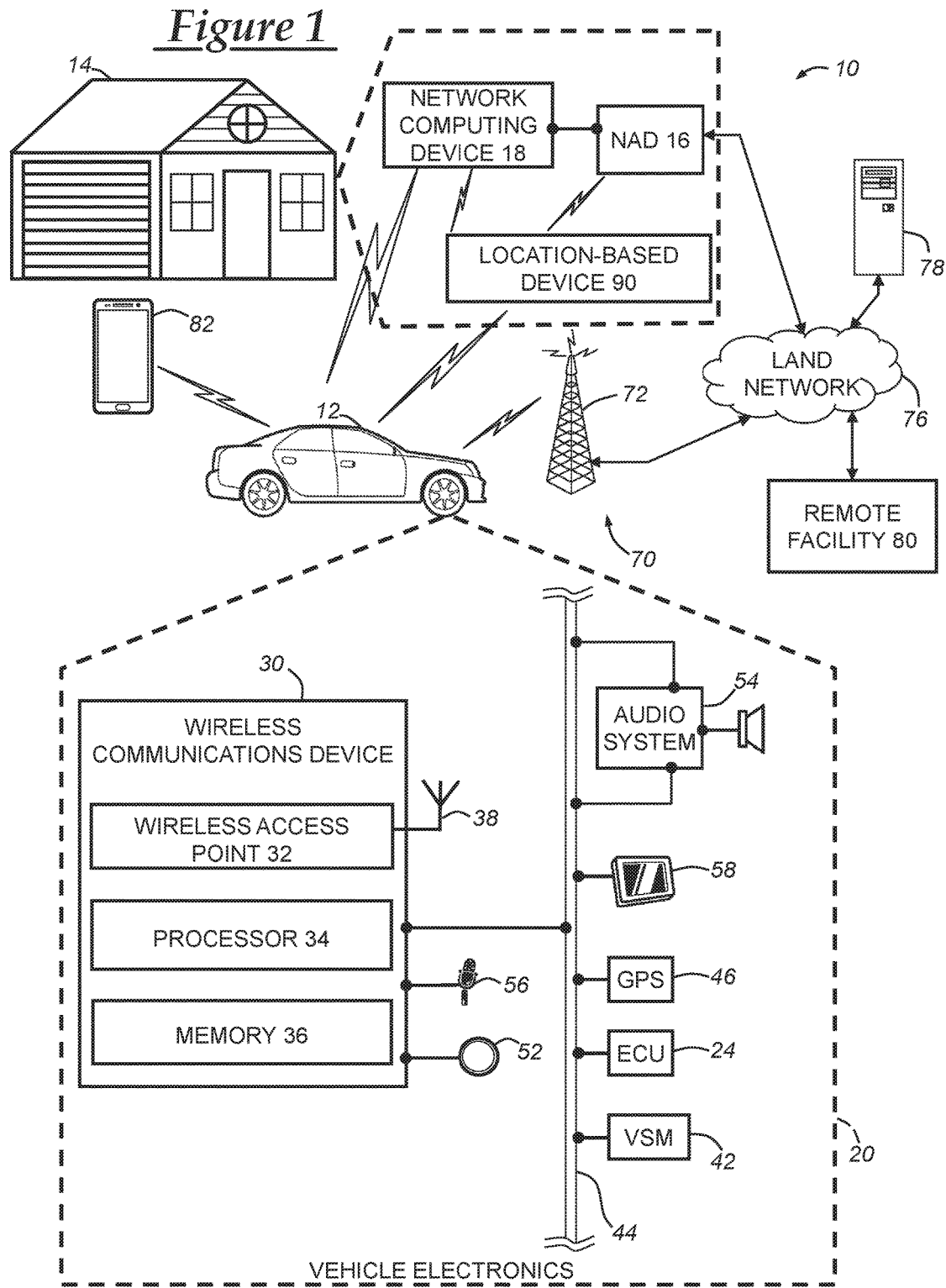
FIG. 1 is a block diagram depicting an embodiment of a communications system that is capable of utilizing the method disclosed herein.

Referring now to FIG. 1, there is shown an operating environment that having a communications system 10 and that can be used to implement the method disclosed herein. Communications system 10 generally includes a vehicle 12 with a wireless communications device 30, a residence 14 with a location-based wireless communications device 90, one or more wireless carrier systems 70, a land communications network 76, a computer 78, a remote facility 80, and a mobile device 82. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Wireless carrier system 70 may be any suitable cellular telephone system. Carrier system 70 is shown as including a cellular tower 72; however, the carrier system 70 may include one or more of the following components (e.g., depending on the cellular technology): cellular towers, base transceiver stations, mobile switching centers, base station controllers, evolved nodes (e.g., eNodeBs), mobility management entities (MMEs), serving and PGN gateways, etc., as well as any other networking components required to connect wireless carrier system 70 with the land network 76 or to connect the wireless carrier system with user equipment (UEs, e.g., which include telematics equipment in vehicle 12). Carrier system 70 can implement any suitable communications technology, including for example GSM/GPRS technology, CDMA or CDMA2000 technology, LTE technology, etc.

Apart from using wireless carrier system 70, a different wireless carrier system in the form of satellite communication can be used to provide uni-directional or bi-directional communication with the vehicle. This can be done using one or more communication satellites (not shown) and an uplink transmitting station (not shown). Uni-directional communication can be, for example, satellite radio services, wherein programming content (news, music, etc.) is received by the uplink transmitting station, packaged for upload, and then sent to the satellite, which broadcasts the programming to subscribers. Bi-directional communication can be, for example, satellite telephony services using the one or more communication satellites to relay telephone communications between the vehicle 12 and the uplink transmitting station. If used, this satellite telephony can be utilized either in addition to or in lieu of wireless carrier system 70.

Land network 76 may be a conventional land-based telecommunications network that is connected to one or more landline telephones and connects wireless carrier system 70 to remote facility 80. For example, land network 76 may include a public switched telephone network (PSTN) such as that used to provide hardwired telephony, packet-switched data communications, and the Internet infrastructure. One or more segments of land network 76 could be implemented through the use of a standard wired network, a fiber or other optical network, a cable network, power lines, other wireless networks such as wireless local area networks (WLANs), or networks providing broadband wireless access (BWA), or any combination thereof.

Computers 78 (only one shown) can be some of a number of computers accessible via a private or public network such as the Internet. Each such computer 78 can be used for one or more purposes, such as a web server accessible by vehicle 12. Other such accessible computers 78 can be, for example: a service center computer where diagnostic information and other vehicle data can be uploaded from the vehicle; a client computer used by the vehicle owner or other subscriber for such purposes as accessing or receiving vehicle data or to setting up or configuring subscriber preferences or controlling vehicle functions; a car sharing server which coordinates registrations from a plurality of users who request to use a vehicle as part of a car sharing service; or a third party repository to or from which vehicle data or other information is provided, whether by communicating with the vehicle 12, remote facility 80, or both. A computer 78 can also be used for providing Internet connectivity such as DNS services or as a network address server that uses DHCP or other suitable protocol to assign an IP address to the vehicle 12.

Remote facility 80 may be designed to provide the vehicle electronics 20, mobile device 82, and/or location-based wireless communications device 90 with a number of different system back-end functions. The remote facility 80 may include one or more switches, servers, databases, live advisors, as well as an automated voice response system (VRS), all of which are known in the art. Remote facility 80 may include any or all of these various components and, preferably, each of the various components are coupled to one another via a wired or wireless local area network. Remote facility 80 may receive and transmit data via a modem connected to land network 76. A database at the remote facility can store account information such as subscriber authentication information, vehicle identifiers, profile records, behavioral patterns, and other pertinent subscriber information. Data transmissions may be conducted by wireless systems, such as IEEE 802.11x, GPRS, and the like.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 20 are shown generally in FIG. 1 and include a wireless communications device 30, a GPS module 46, an engine control unit (ECU) 24, other VSMs 42, and numerous other components and devices. Some or all of the different vehicle electronics may be connected for communication with each other via one or more communication busses, such as bus 44. Communications bus 44 provides the vehicle electronics with network connections using one or more network protocols. Examples of suitable network connections include a controller area network (CAN), a media oriented system transfer (MOST), a local interconnection network (LIN), a local area network (LAN), and other appropriate connections such as Ethernet or others that conform with known ISO, SAE, and IEEE standards and specifications, to name but a few.

The vehicle 12 can include numerous vehicle system modules (VSMs) as part of vehicle electronics 20, such as the engine control unit (ECU) 24, wireless communications device 30, a BCM (not shown), GPS module 46, vehicle user interfaces 52-58, as will be described in detail below. The vehicle 12 can also include other VSMs 42 in the form of electronic hardware components that are located throughout the vehicle and, which may receive input from one or more sensors and use the sensed input to perform diagnostic, monitoring, control, reporting, and/or other functions. For example, other VSMs may include a telematics unit, a center stack module (CSM), an infotainment unit, a powertrain control module, or a transmission control unit. Each of the VSMs 42 is preferably connected by communications bus 44 to the other VSMs, as well as to the wireless communications device 30, and can be programmed to run vehicle system and subsystem diagnostic tests. One or more VSMs 42 may periodically or occasionally have their software or firmware updated and, in some embodiments, such vehicle updates may be over-the-air (OTA) updates that are received from a computer 78 or remote facility 80 via land network 76, location-based wireless communications device 90, and/or communications device 30. As is appreciated by those skilled in the art, the above-mentioned VSMs are only examples of some of the modules that may be used in vehicle 12, as numerous others are also possible.

Engine control unit (ECU) 24 may control various aspects of engine operation such as fuel ignition and ignition timing. ECU 24 is connected to communications bus 44 and may receive operation instructions from a BCM or other VSMs 42, such as wireless communications device 30. In one scenario, the ECU 24 may receive a command from the BCM to start the vehicle—i.e., initiate the vehicle ignition or other primary propulsion system (e.g., a battery powered motor). In another scenario, the ECU 24 may be provided a signal from the wireless communications device 30 or a BCM that directs the ECU 24 to not perform any operations or at least to not start the vehicle's engine or primary propulsion system. This signal may be sent by device 30 or a BCM in response to receiving a remove vehicle disable (RVD) command from a computer 78 or remote facility 80, as will be discussed in more detail below.

Wireless communications device 30 is capable of communicating data via short-range wireless communications (SRWC). As shown in the exemplary embodiment of FIG. 1, wireless communications device 30 includes a wireless access point 32, a processor 34, memory 36, and one or more antennas 38 (only one is shown). In one embodiment, wireless communications device 30 may be a standalone module or, in other embodiments, device 30 may be incorporated or included as a part of one or more other vehicle system modules, such as a center stack module (CSM), body control module, an infotainment module, a telematics module, a head unit, and/or a gateway module. In some embodiments, the device 30 can be implemented as an OEM-installed (embedded) or aftermarket device that is installed in the vehicle.

Wireless communications device 30 can be configured to communicate wirelessly according to one or more wireless protocols, including short-range wireless communications (SRWC), such as WiGig™, Wi-Fi™, WiMAX™, ZigBee™, Wi-Fi Direct™, Bluetooth™ Bluetooth Low Energy™ (BLE), near field communication (NFC), or any other IEEE 802.11 protocols. In many embodiments, the wireless communications device 30 can operate according to a SRWC that enables a multi-Gbps data transfer rate, such as IEEE 802.11ad (WiGig™), IEEE 802.11aj, IEEE 802.11ay, and IEEE 802.11az. As used herein, a "multi-Gbps transfer rate" is a transfer rate of at least 1.00 gigabit per second. In other embodiments, the wireless communications device 30 can operate according other Very High Throughput (VHT) WLAN standards or protocols. In some embodiments, the wireless communications device 30 may be a tri-band WiGig™ enabled device (discussed in more detail below) such that the device 30 is capable of communications according to multiple frequency bands. More specifically, WiFi and WiGig™ tri-band means the support of WiFi over 2.4 and 5 GHz and WiGig™ over 60 GHz.

The wireless access point 32 enables the wireless communications device 30 to transmit and receive SRWC, such as BLE or IEEE 802.11ad. The WAP 32 may include a SRWC chipset or any of the various network interface controllers (including wireless network interface controllers) that are discussed in more detail below with respect to location-based device 90. The wireless communications device 30 can use one or more SRWC protocols to connect to one or more short-range wireless communications (SRWC) device. As used herein, a short-range wireless communications (SRWC) device is a device capable of SRWC and may include a SRWC chipset. Additionally, in some embodiments, the wireless communications device may include a cellular chipset thereby allowing the device to communicate via one or more cellular protocols, such as those used by cellular carrier system 70.

Processor 34 can be any type of device capable of processing electronic instructions including microprocessors, microcontrollers, host processors, controllers, vehicle communication processors, and application specific integrated circuits (ASICs). It can be a dedicated processor used only for communications device 30 or can be shared with other vehicle systems. Processor 34 executes various types of digitally-stored instructions, such as software or firmware programs stored in memory 36, which enable the device 30 to provide a wide variety of services. For instance, processor 34 can execute programs or process data to carry out at least a part of the method discussed herein or to supplement at least of the method discussed herein. Memory 36 may include RAM, other temporary powered memory, any non-transitory computer-readable medium (e.g., EEPROM), or any other electronic computer medium that stores some or all of the software needed to carry out the various device functions discussed herein.

In one embodiment, the wireless communications device 30 may operate both when the vehicle is in a powered on state and when the vehicle is in a powered off state. As used herein, a "powered on state" is a state of the vehicle in which the ignition or primary propulsion system (or primary mover) of the vehicle is powered on and, as used herein, a "powered off state" is a state of the vehicle in which the ignition or primary propulsion system (or primary mover) of the vehicle is not powered on. The operation or state of the wireless communications device 30 may be controlled by another vehicle system module, such as by a BCM or by an infotainment module. In the powered on state, the wireless communications device 30 may always be kept "on" or supplied with power from a vehicle battery or other power source. In the powered off state, the wireless communications device 30 may be kept in a low-power mode or may be supplied power periodically so that device 30 may wake up and perform operations, such as listening or probing for wireless devices to connect to.

For example, the wireless communications device 30 may be periodically woken up by a BCM and, subsequently, the device 30 may perform a scan using SRWC, such as Bluetooth Low Energy™. This scan may be carried out over a predetermined period of time or may be based on various other vehicle or environmental states. The vehicle may repeat this process until a wireless message is detected or until the vehicle is turned on (i.e., switched from a powered off state to a power on state). Upon detection of a SRWC device or receipt of a wireless message, the wireless communications device 30 may communicate with the SRWC device by transmitting and receiving one or more wireless messages. These messages may include authenticating or otherwise verifying the identity of the SRWC device which sent (or ostensibly sent) the wireless message, authorizing the SRWC device using one or more authorization techniques (as discussed more below), and/or pairing the SRWC device and the wireless communications device 30 (e.g., such as through Bluetooth™ or Bluetooth Low Energy™ pairing).

Once a connection is established between the wireless communications device 30 and the SRWC device, which may be mobile device 82 or location-based wireless communications device 90, the wireless communications device 30 may wait for a wireless message from the SRWC device that includes a specific command or function. Or, the vehicle may send a command or a request to the SRWC device. Once device 30 receives such wireless message, the vehicle can authenticate and/or authorize the message and/or the SRWC device. Thereafter, the command or function may be interpreted, modified, and/or passed along to a specific VSM that is to perform the command or function. Alternatively, a new message based on the command or function may be generated and sent to another VSM.

In some embodiments, the vehicle or the location-based device may recognize or realize certain user actions that indicate imminent vehicle operation. For example, certain user actions that may indicate imminent vehicle operation may be one or more of the following: a user approach to the vehicle, a user operation of the vehicle, a user access of the vehicle, an unlock/lock operation, a remote start signal sent to the vehicle, detection of a user in a garage or an area surrounding a vehicle storage area or parking area, actuation of a garage door, or any other actions that indicate imminent vehicle operation. Imminent vehicle operation may be made using various vehicle system modules and/or SRWC devices. For example, the wireless communications device 30 may realize an increasing received signal strength indicator (RSSI) included in messages received from the location-based device 90. Another example may be the detection of the SRWC by its SSID (i.e., network ID).

In one embodiment, if the vehicle determines that a user is approaching the vehicle, the vehicle may, in anticipation of use and/or operation of the vehicle by the user, carry out one or more vehicle functions. For example, upon a determination that a user is approaching the vehicle (which may indicate the user or operation of the vehicle momentarily or imminently), the vehicle may transmit data to and/or receive data from a SRWC device, such as location-based wireless communications device 90.

A vehicle function is any function or operation that may be performed by the vehicle, including initiating or booting a telematics unit, a GPS module, an infotainment unit, a center stack module (CSM), or other VSM. Additionally, a vehicle function may be unlocking or locking the vehicle doors via a BCM, starting the ignition or primary propulsion system of the vehicle, disabling/enabling the vehicle ignition or primary propulsion system, heating or cooling passenger seats included in the vehicle, performing air conditioning or heating of the vehicle cabin, turning off/on or flashing headlights or other lights included in the vehicle, emitting an audible sound using a vehicle horn or speakers (such as those included in audio system 54), downloading information (e.g., over-the-air updates) or content data (e.g., audio/video playlists or files) from a remote device or a device at location 14, downloading or uploading information and/or content data from or to a SRWC device (e.g., location-based device 90), and/or performing various other operations or functions of the vehicle, many of which are described herein. Additionally, some vehicle functions may be modified, enabled, or disabled based on certain conditions, including the present vehicle state, detection of the vehicle's presence at a location (e.g., residence 14), the weather or other environmental conditions, the identity of the SRWC device, and/or the time of day. For example, when the external air temperature is above 30 degrees Celsius, then the air conditioner may be initiated. Such vehicle functions may also be carried out upon the loss of connection of the SRWC device, the powering off of the vehicle, and/or upon a determination that a vehicle operator or passenger has departed the vehicle.

Wireless communications device 30 may be in communication with one or more remote networks via packet-switched data communication. This packet-switched data communication may be carried out through use of a wireless access point that is connected to a land network via a router or modem. When used for packet-switched data communication such as TCP/IP, the communications device 30 can be configured with a static IP address or can be set up to automatically receive an assigned IP address from another device on the network such as a router or from a network address server.

Packet-switched data communications may also be carried out via use of a cellular network that may be accessible by the device 30 via, for example, a telematics unit included in the vehicle. In one embodiment, the communications device 30 may also include a cellular chipset or be communicatively coupled to a device comprising a cellular chipset such as a telematics unit. In either event, communications device 30 may, via a cellular chipset, communicate data over wireless carrier system 70. In such an embodiment, radio transmissions may be used to establish a communications channel, such as a voice channel and/or a data channel, with wireless carrier system 70 so that voice and/or data transmissions can be sent and received over the channel. Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known to those skilled in the art. In modern networks such as LTE, voice and data communications may be carried out in parallel.

Global position system (GPS) module 46 receives radio signals from a constellation of GPS satellites (not shown). From these signals, the module 46 can determine vehicle position which may enable the vehicle to determine whether it is at a known location, such as home or workplace. Moreover, GPS module 46 can provide this location data to wireless communications device 30, which can then use this data to identify known locations, such as a vehicle operator's home or workplace. Additionally, GPS module 46 may be used to provide navigation and other position-related services to the vehicle operator. Navigation information can be presented on the display 58 (or other display within the vehicle) or can be presented verbally such as is done when supplying turn-by-turn navigation. The navigation services can be provided using a dedicated in-vehicle navigation module (which can be part of GPS module 46), or some or all navigation services can be done via a telematics unit installed in the vehicle, wherein the position information is sent to a remote location for purposes of providing the vehicle with navigation maps, map annotations (points of interest, restaurants, etc.), route calculations, and the like. The position information can be supplied to remote facility 80 or other remote computer system, such as computer 78, for other purposes, such as fleet management and/or for use in a car sharing service. Also, new or updated map data can be downloaded to the GPS module 46 from the remote facility 80 via a vehicle telematics unit.

Vehicle electronics 20 also includes a number of vehicle user interfaces that provide vehicle occupants with a means of providing and/or receiving information, including pushbutton(s) 52, audio system 54, microphone 56, and visual display 58. As used herein, the term "vehicle user interface" broadly includes any suitable form of electronic device, including both hardware and software components, which is located on the vehicle and enables a vehicle user to communicate with or through a component of the vehicle. The pushbutton(s) 52 allow manual user input into the communications device 30 to provide other data, response, or control input. Audio system 54 provides audio output to a vehicle occupant and can be a dedicated, stand-alone system or part of the primary vehicle audio system. According to the particular embodiment shown here, audio system 54 is operatively coupled to both vehicle bus 44 and an entertainment bus (not shown) and can provide AM, FM and satellite radio, CD, DVD and other multimedia functionality. This functionality can be provided in conjunction with or independent of an infotainment module. Microphone 56 provides audio input to the wireless communications device 30 to enable the driver or other occupant to provide voice commands and/or carry out hands-free calling via the wireless carrier system 70. For this purpose, it can be connected to an on-board automated voice processing unit utilizing human-machine interface (HMI) technology known in the art. Visual display or touch screen 58 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

The mobile device 82 is a SRWC device and may include: hardware, software, and/or firmware enabling cellular telecommunications and SRWC as well as other mobile device applications. The hardware of the mobile device 82 may comprise: a processor and memory (e.g., non-transitory computer readable medium configured to operate with the processor) for storing the software, firmware, etc. The mobile device processor and memory may enable various software applications, which may be preinstalled or installed by the user (or manufacturer) (e.g., having a software application or graphical user interface or GUI). One implementation of a vehicle-mobile device application may enable a vehicle user to communicate with the vehicle 12 and/or control various aspects or functions of the vehicle, some of which are listed above. Another implementation may enable the user to make a reservation to use a vehicle that is a part of a car sharing service. Additionally, the application may also allow the user to connect with the remote facility 80 or call center advisors at any time.

Figure 2:
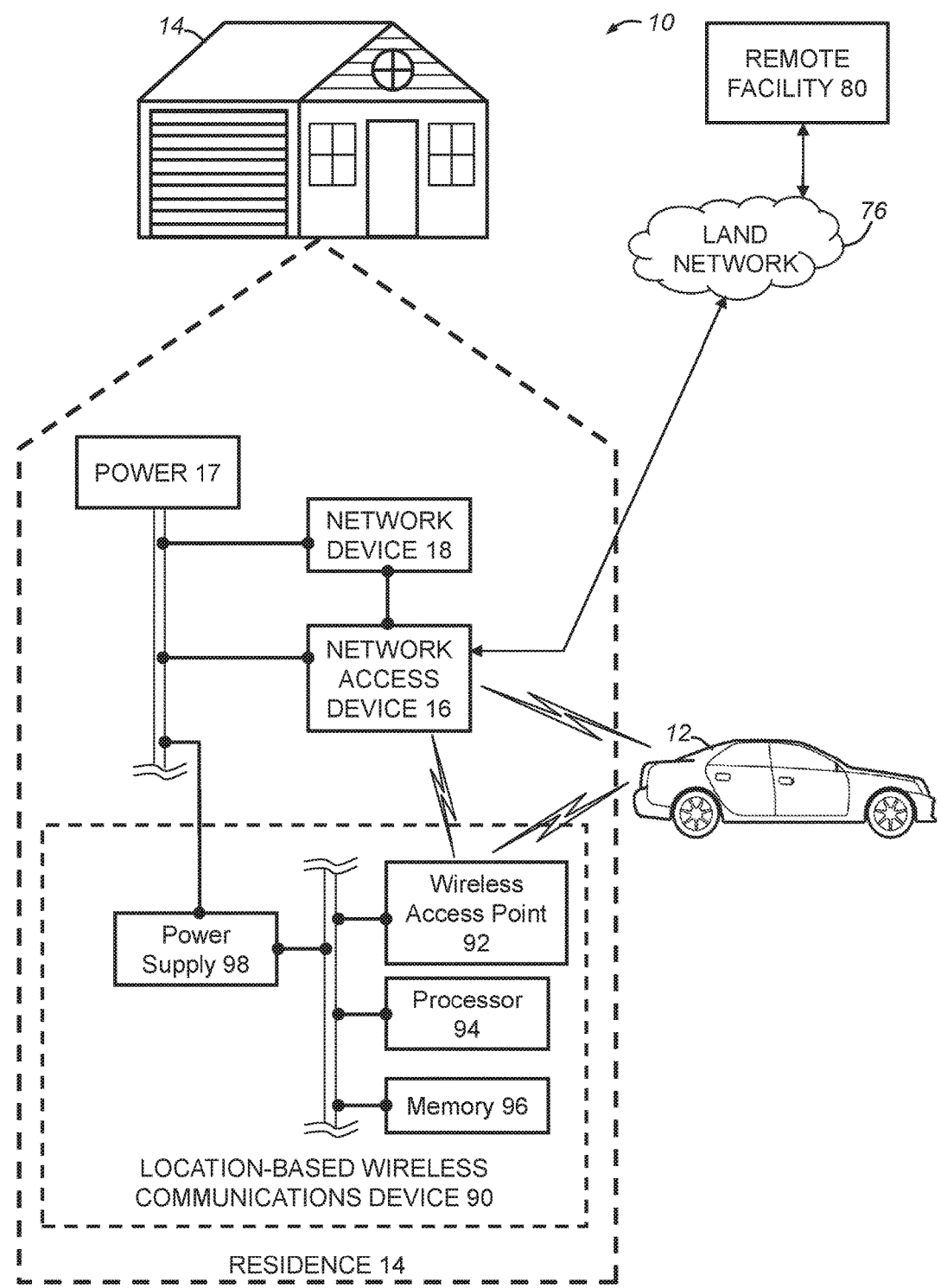
FIG. 2 is a block diagram depicting a more detailed view of some of the elements included in the embodiment of the communications system of FIG. 1.

With reference to FIG. 2, there is shown a more detailed view of some of the components included in the embodiment of the communications system of FIG. 1, namely the location or residence 14, and the location-based wireless communications device 90.

The location 14 is depicted as a residential home, however, it should be appreciated that location 14 may be any location that includes a location-based wireless communications device. Location 14 is shown to include a network access device 16, a network computing device 18, power source 17, and location-based wireless communications device 90. In one example, location 14 can be a residential home or other residential building (as depicted in the illustrated embodiment), a workplace, a public building or installment, place of business, a vehicle garage, parking structure, parking lot, or any other location that can include a location-based wireless communications device.

Network access device (NAD) 16 is a network computing device and includes hardware that communicates with one or more remote networks. As used herein, and as those skilled in the art will appreciate, a "modem" refers to a network hardware device that modulates one or more signals to encode data for transmission and that demodulates signals to decode received data. Also, as used herein, and as those skilled in the art will appreciate, a "router" refers to a networking device that facilitates communications between computer networks, such as between an intranet (e.g., local area network (LAN), wireless local area network (WLAN), wide area networks (WAN)) and a remote network, such as the Internet or a network at remote facility 80 or computer 78. The router, which may be included as part of the network access device, may keep addressing information for devices that are a part of a local intranet, such as network computing device 18 and location-based device 90. The addressing information may be kept in a routing table or a routing information base (RIB), which is a data structure that stores information that can be used to route IP packets that are being communicated between networks. The routing table can be stored in a memory device at network access device 16, and such functionality of the network access device can be carried out by a processor or other processing device installed in network access device 16. In one embodiment, network access device 16 includes a modem and a router, and is configured to transfer data between network computing devices and a land network 76.

Additionally, network access device 16 may include one or more network interface controllers (NIC), which can include any of a variety of network drivers, network adapters, network cards, or network interfaces. The network interface controller can be a hardware component that connects a circuit board (e.g., motherboard) or communications bus to a computer network, such as a LAN or a WLAN. In one example, a first NIC of network access device 16 can be an Ethernet card that enables communications between the network access device 16 and a network computing device via an Ethernet cable. Additionally, or alternatively, a second NIC of network access device 16 can be a wireless network interface controller (WNIC), which can include an antenna and which may operate according to one or more the SRWC communications as described above, including IEEE 802.11b/g/n/ac/ad. In many embodiments, the network access device 16 includes numerous network interfaces, including numerous wired ports, including Ethernet ports, universal serial bus (USB) ports, fiber-optic ports, token ring, as well as numerous other ports known to those skilled in the art. Additionally, or alternatively, network access device 16 may be able to communicate accord to a variety of SRWC and may include variety of WNICs.

Network computing device 18 can be any electronic device that can be connected to a computer network, and which may carry out network communications according to one or more network protocols, such as TCP/IP or UDP/IP. The network computing device may include a processor or other processing device, a memory device, and a network interface controller. In one embodiment, network computing device 18 can be a network access device (e.g., network access device 16) or a personal computer, such as a desktop computer or a laptop computer. In another embodiment, network computing device 18 is a smart television (or a connected TV, a setop box (STB), or hybrid TV), which is a television set that includes network capabilities, such as internetworking capabilities. In yet another embodiment, the network computing device is a dongle, which is a device that may be physically connected (e.g., connected via a wire, inserted into a physical port) to a television or other computing device that permits networking capabilities. In some embodiments, the smart TV or the dongle can allow media content to be streamed or otherwise downloaded to a computing device at location 14, which may then be played by a user. Additionally, or alternatively, the media content may be forwarded to vehicle 12 via location-based wireless communications device 90, which will be described in more detail below.

In one embodiment, network computing device 18 may be a network camera, such as an internet protocol (IP) camera. The network camera is any network computing device that is capable of recording images or video using an optical device, such as a digital camera. The network camera may include a processing device and/or a memory device, which may store the recorded images or videos. The network camera can also send the images or video to another network computing device, network access device 18, or location-based wireless communications device 90. In one embodiment, network camera may record or stream video of an area surrounding a garage or vehicle storage area, and then send the video to location-based wireless communications device 90, which may then forward the video to vehicle 12. The vehicle 12 may then display the video or use the video to make one or more determinations that may be useful for one or more vehicle functions, such as informing a user that an object is in the path of the vehicle. The location-based wireless communications device 90 can initiate this camera streaming process upon a detection that vehicle 12 is departing from or arriving at location 14, which will be described in more detail below.

Location-based wireless communications device 90 is network computing device that provides a particular set of functionality to a communications network at location 14. The location-based wireless communications device 90 is shown in the illustrated embodiment to include a wireless access point 92, a processor 94, a memory 96, and a power supply 98. The power supply may connect to power source 17, which may provide power to location-based device 90. Power supply 98 can include a rectifier for converting alternating current to direct current, and/or may include other components, many of which are known to those skilled in the art. The power supply 98 may also include a wire and/or a male two- or three-prong plug that plugs into a standard 120 Volt outlet. Other variations of deriving power from a power main at a location will be known to those skilled in the art.

As discussed above, location-based wireless communications device 90 includes a wireless access point 92. The wireless access point may include any one or more of the features or components described above with respect to wireless access point 32 included in wireless communications device 30 of vehicle 12. For example, the wireless access point 92 may operate according to any one or more of the IEEE 802.11 protocols, Wi-Fi™ WiMAX™, ZigBee™, Wi-Fi Direct™, Bluetooth™, Bluetooth Low Energy™ (BLE), or near field communication (NFC). In many embodiments, the location-based wireless communications device 90 can operate according to a SRWC that enables a multi-Gbps data transfer rate, such as IEEE 802.11ad, IEEE 802.11aj, IEEE 802.11ay, and IEEE 802.11az. Additionally, the location-based wireless communications device 90 can include any number and/or variety of network interface controllers, some of which may be integrated into or with the wireless access point 92. In one embodiment, the location-based wireless communications device 90 can communicate with vehicle 12 using a wireless network card or chipset and can communicate with network access device 16 via an Ethernet cable that connects the devices respective network interfacing controllers.

In one embodiment, location-based wireless communications device 90 can operate wireless communications according to one or more SRWC. For example, location-based device 90 may be a WiGig tri-band enabled device such that communications according to multiple frequency bands, such as the 2.4 GHz band, the 5 GHz band, and the 60 GHz band (e.g., according to the IEEE 802.11b/g/n protocol, the IEEE 802.11n/ac protocol, and the IEEE 802.11ad protocol, respectively). In other embodiments, location-based wireless communications device 90 can operate using any of a variety of combinations of the SRWC protocols.

Location-based device 90 can include one or more antennas and, in some embodiments, may be capable of beamforming. As those skilled in the art will appreciate, "beamforming" refers to the emission of multiple signals using multiple antennas to send a single message and wherein the emission of the signals is done in a manner such that the interference between the signals creates a stronger signal that is directed toward the recipient device. In one example, a recipient device, such as the vehicle 12, may send information to the location-based device relating to its relative location with respect to the location-based device 90. Then, the location-based device 90 may use processor 94 to calculate the phase shift and/or other parameters that can be used in creating an effective beamforming signal. Subsequently, location-based device 90 may transmit the same signal from its multiple antennas at or near the same time as to achieve directional signal transmissions, which may prove useful in overcoming signal interference. Similarly, the vehicle may have multiple antennas 38 that can use beamforming techniques to transfer data to the location-based device using IEEE 802.11ad or other suitable protocol.

In addition to acting as a wireless access point (WAP) for devices to connect to, location-based device 90 may carry out wireless communications with another wireless access point, such as wireless communications device 30 included in vehicle 12 or network access device 16. In one embodiment, network access device 16 may provide location-based device 90 with a connection to the Internet or other remote network, such as via land network 76. Location-based device 90 may be set to a station or a client mode and, thus, may then carry out wireless communications with other WAPs. As used herein, a station or a client mode is an operating mode of a wireless communications device that enables the device to act as a station or client device thereby allowing the device to scan for and connect to host devices (e.g., wireless access points). More particularly, in the client mode, the client device permits another device (e.g., a server device) to control communication protocols, etc. The other WAPs may be set to a wireless access point mode and provide a hotspot for location-based device 90 to connect to when device 90 is operating in a station mode. A hotspot is an area where a wireless data connection may be established between a wireless device operating in a station or client mode and the device hosting the hotspot via a wireless access point. It should be appreciated that the protocol used in providing a hotspot is not limited to Wi-Fi™ or WiGig™, and that any SRWC, such as those listed above, may be used.

Processor 94 can be any type of device capable of processing electronic instructions including any of those discussed above with respect to processor 34 of vehicle wireless communications device 30. Memory 96 can be any type of digital information storing or recording device, such as RAM, ROM, or any of the other types of memory discussed herein, including volatile or non-volatile memory.

With reference to FIG. 3, there is shown an embodiment of a method 300 of wireless communication between a location-based wireless communications device and a vehicle. In at least one embodiment, the method 300 may be carried out in part or in whole by location-based wireless communications device 90. Method 300 may be used in various scenarios. In one scenario, a remote facility 80 may desire to send an over-the-air (OTA) update or media content to the vehicle 12 via land network 76 and location-based device 90. In another scenario, the vehicle may desire to send information to a remote facility or device via location-based device 90. In yet another scenario, a network computing device 18 may desire to send data (e.g., media content, a video stream) to and/or receive data from a vehicle 12 via the location-based device 90. As discussed below, various embodiments of method 300 address some of these scenarios, while certain embodiments of methods 400 and 500 discuss these scenarios in more detail.

Method 300 begins with step 310, wherein a detection is made when the vehicle is within an operating range of the location-based wireless communications device. As used herein, an "operating range" refers to a range in which wireless communications between the location-based wireless communications device and the vehicle can be carried out, or a range spanning a hotspot produced or detected by the location-based wireless communications device. For example, vehicle 12 may be detected to be in an operating range when the location-based device 90 detects a hotspot hosted by wireless communications device 30 of vehicle 12. In another example, vehicle 12 may be detected to be in an operating range when the location-based device 90 receives a wireless message from vehicle 12 via wireless communications device 30.

In other embodiments, a different triggering event may be used in place of the vehicle detection. As used herein, a "triggering event" is any event that is associated with one or more vehicle-related functions that includes the transfer of data between the location-based wireless communications device and the vehicle. A triggering event may be the detection of the vehicle's location or presence at a specified location (e.g., residence 14), a user action or indication pertaining to the vehicle or one or more vehicle functions, the occurrence of a preset time that triggers a vehicle-related event (e.g., an event associated with one or more vehicle functions), a vehicle state change, or an indication of imminent vehicle operation. The detection of the vehicle's location or presence at a specified location can include a detection based upon wireless signaling, as mentioned above, or may include use of other location indicators, such as GPS. In one example, a vehicle may send a message to location-based wireless communications device 90 via cellular carrier system 70, land network 76, and network access device 16. The message may indicate that the vehicle is to arrive soon at the location 14.

Examples of user actions that pertain to the vehicle or one or more vehicle functions include operation of one or more vehicle user interfaces that indicate a desired function or operation that can be performed at least in part by the location-based wireless communications device 90 and/or vehicle 12; operation of a network computing device or network access device at location 14 that indicates a desired function or operation that can be performed at least in part by the location-based wireless communications device 90 and/or vehicle 12; or a detection of a property, condition, or state of a user that corresponds to a preset property, condition, or state. In one particular example, a home automation device (i.e., a network computing device) at location 14 may detect that a user has turned off a smart TV in the middle of a movie and, subsequently, the user has opened a garage door. The location-based device 90 may determine that a user is likely to depart the location 14 and, thus, location-based device 90 may download the media content (e.g., the show) from the smart TV and then upload the media content to the vehicle using a wireless connection, as discussed in more detail below.

In other embodiments, a vehicle state change may be used as a triggering event. A vehicle state change is a change in state of one or more vehicle components, including ECU 24, a BCM, wireless communications device 30, or any other VSM 42. For example, a vehicle state change includes a vehicle lock/unlock operation, a vehicle start operation (i.e., a vehicle state change from a powered off state to powered on state), a vehicle termination operation (i.e., a vehicle state change from a powered on state to powered off state), a vehicle door or latch operation, a vehicle gear shift operation, and a vehicle component power on/off operation. After the triggering event, such as a detection that the vehicle is within an operating range of the location-based wireless communications device, the method 300 continues to step 320.

In step 320, a short-range wireless communication (SRWC) connection between the location-based wireless communications device and the vehicle is established. As discussed above, various SRWC can be used by both wireless communications device 30 and location-based device 90. In one embodiment, the SRWC connection is carried out over at least a first frequency band that enables a multi-Gbps data transfer rate and, in such an embodiment, the first frequency band is referred to a multi-Gbps capable frequency band. The first frequency band can correspond to those used by many of the IEEE 802.11 protocols, including IEEE 802.11ad, IEEE 802.11aj, IEEE 802.11ay, and IEEE 802.11az. In one particular embodiment, the first frequency band can include one or more wireless communication channels, wherein each of the one or more wireless communication channels includes a center frequency between 35 GHz and 100 GHz. For example, a frequency band corresponding to IEEE 802.11ad (i.e., the IEEE 802.11ad frequency band) has an operational frequency of 60 GHz.

In one embodiment, once it is determine that the SRWC connection is to be established between the location-based wireless communications device and the vehicle, then the location-based communications device can send a connection request message to the vehicle communications device 30. The vehicle wireless communications device 30 can receive the connection request message and then respond by sending a connection confirmation message to the location-based device 90. One or more wireless communications may be carried out such that a secured wireless connection is established. The connection request message, the connection confirmation message, and/or the one or more communications (collectively, "connection establishment messages") can be a part of an authentication handshake that is carried out by the devices in order to establish a secure connection. Any one or more of these connection establishment messages may include an identifier of location-based device 90 or wireless communications device 30, such as a media access control (MAC) address or a service set identifier (SSID). Additionally, or alternatively, security information may be sent as part of the one or more connection establishment messages, such as a passphrase corresponding to a SSID. The security information can include a public key, a private key, a certificate, a nonce, or a checksum. Also, in some embodiments, any of the connection establishment messages can be encrypted with a public key or a private key and according to a public or private key encryption scheme. In one embodiment, an encryption scheme according to IEEE 802.11i (e.g., Counter Mode with Cipher Block Chaining Message Authentication Code Protocol (CCMP)) or Galois/Counter Mode (GCM) can be used to carry out secured wireless communications over the SRWC connection.

In one embodiment, the SRWC connection may establish a SRWC connection using the IEEE 802.11ad frequency band. The SRWC connection may be established through transmitting one or more connection establishment messages using the location-based device 90, each of which may include a preamble portion, a header portion, and a data portion. The SRWC connection using the IEEE 802.11ad frequency band can use GCM encryption scheme to secure messages sent over the connection. Once a connection is established, the method 300 continues to step 330.

In step 330, data is transferred between the location-based wireless communications device and the vehicle over the SRWC connection. For example, once the SRWC connection is established, data may be transferred from the vehicle 12 to the location-based device 90, from the location-based device 90 to the vehicle 12, or in both directions. In one embodiment, a vehicle update or various media content may be downloaded to the location-based device 90 from a network computing device or remote server before the presence of the vehicle is detected (or before another triggering event). Then, upon the detection of the vehicle (or other triggering event), step 320 may be carried out resulting in a connection between the vehicle 12 and the location-based device 90. Then, the vehicle update or the media content may be transmitted using the SRWC connection to the vehicle, which may then perform the update, stream the media content, and/or store other data. In addition, vehicle upload data may be transmitted from the vehicle to the location-based device 90, which stores the uploaded data and then forwards the data to a network device or remote server.

In some embodiments, the SRWC connection is carried out over an IEEE 802.11ad frequency band that enables a multi-Gbps data transfer rate. In such embodiments, the location-based device 90 can "beam" the data to the vehicle using multiple antennas and according to beamforming techniques, as discussed above. Numerous other scenarios and embodiments exist, some of which will be described in detail below with reference to FIGS. 4 and 5. The method 300 ends.

With reference to FIG. 4, there is shown an embodiment of a method 400 of wireless communication between a location-based wireless communications device and a vehicle. Generally, method 400 includes receiving data at the location-based wireless communications device from a network computing device or a network access device, storing the data on a memory device of the location-based device, detecting a triggering event, establishing a multi-Gbps capable SRWC connection with a vehicle, and transmitting the data to the vehicle using the SRWC connection.

In one embodiment, method 400 can be used to send over-the-air (OTA) updates or media content that is downloaded from a remote server to the vehicle. For example, an OTA update for a VSM 42 of vehicle 12 can be downloaded to the location-based device 90 from a remote server, such as computer 78 or a server at remote facility 80. The location-based device may then detect the presence of vehicle 12 within an operating range and, subsequently, transfer the OTA update to the vehicle using a multi-Gbps capable SRWC connection, such as a connection operating according to IEEE 802.11ad. In another embodiment, data from a network computing device may be downloaded to the location-based device and subsequently sent to the vehicle using the multi-Gbps capable SRWC connection. In yet another embodiment, the location-based device 90 may be used to send video data from one or more cameras located at location 14 to the vehicle. The video data may be "live" data that is streamed to the vehicle via location-based device 90.

Method 400 beings with step 410, wherein data is received at the location-based wireless communications device from a network access device using a communication link between the location-based device and the network access device. In one embodiment, a remote server, such as a server at remote facility 80 or computer 78, may send data to location-based wireless communications device 90 via network access device 16. The data may be a vehicle update (e.g., an over-the-air (OTA) vehicle update to a vehicle system module), media content (e.g., images, pictures, video, audio), and may be intended to be transferred to a vehicle (see step 450).

In another embodiment, in step 410, data is received at the location-based wireless communications device from a network computing device using a communication link between the location-based device and the network computing device. In one embodiment, media content or other data may be sent from a smart TV or dongle 18 to the location-based wireless communications device 90 via the communication link.

In any of the embodiments described above, the communication link can be any of those SRWC communications, such as IEEE 802.11b/g/n, or a wired connection, such as an Ethernet connection. Additionally, the data may be transferred after a triggering event, such as any of those triggering events described above. In one embodiment, a user may upload certain media content to a user's media account and, after detecting a change in the user's account, the media content may be downloaded to the location-based device 90, which may subsequently transfer the content to vehicle 12 (step 450). The method 400 continues to step 420.

In step 420, the data is stored at the location-based wireless communications device after the data is received from the remote server via the network access device. As discussed above, in many embodiments, location-based device 90 includes a memory device 96. Once the data is received from the network access device or another network computing device, then the data is stored in memory 96. The memory may be a hard disk drive (HDD), a solid state drive (SSD), or other suitable memory device.

In other embodiments, it may be desirable to stream the data received from the network device. For example, a network camera may send video data to the location-based device, which may then send the video data to the vehicle (step 450) such that the video data from the camera is streamed for viewing by an operator at vehicle 12. In some embodiments, it may not be desirable to store the video data in a non-volatile storage device, but rather to immediately stream such data to the vehicle. The method 400 continues to step 430.

In step 430, a vehicle is detected to be within an operating range of the location-based wireless communications device. In other embodiments, a different triggering event is detected or determined to occur. This step is analogous to step 310 of method 300 described above and, accordingly, any one or more embodiments described above in step 310 may be used here in step 430. The method 400 continues to step 440.

In step 440, a short-range wireless communication (SRWC) connection between the location-based wireless communications device and the vehicle is established. This step is analogous to step 320 of method 300 described above and, accordingly, any one or more embodiments described above in step 320 may be used here in step 440. In many embodiments, the SRWC connection may be carried out over at least a first frequency band that enables a multi-Gbps data transfer rate, such as IEEE 802.11ad.

In other embodiments, step 430 and/or 440 may be carried out before or during steps 410, 420, and/or 430. For example, a vehicle may be placed in a powered-on state and the transmission of the vehicle may be set to a reverse gear, which can constitute a triggering event (step 430). At that time, it may be desirable to connect the vehicle to one or more network cameras that are situated at location 14 and facing an area around a garage or other vehicle storage or parking area. At this time, a SRWC connection between the vehicle 12 and the location-based wireless communications device 90 may be established (step 440), as well as a communication link between the network camera(s) and the location-based wireless communications device. The camera(s) can be connected to the location-based wireless communications device using a communication link that operates over at least a second frequency band, or via a wired connection, such as Ethernet. Then, the network camera(s) may obtain video of the area around the garage or other vehicle storage or parking area. The video data can be sent to and received at the location-based wireless communications device from the camera(s) (step 410). The video data may then be sent from the location-based device to the vehicle using the SRWC connection (step 450) to be streamed for viewing by a vehicle operator. The method 400 continues to step 450.

In step 450, after the SRWC connection is established, data is recalled from a memory device included in the location-based wireless communications device and sent to the vehicle using the SRWC connection. In one embodiment, the location-based wireless communications device 90 can use processor 94 to partition the data into multiple wireless messages, which may be sent using one or more antennas included on location-based device 90. The location-based device 90 may also use known beamforming techniques, which includes sending a single message using multiple wireless signals sent from multiple antennas, as discussed above.

In another embodiment, data may not need to be recalled from the memory device, but rather may be streamed from a network computing device using the location-based wireless communications device. For example, in the embodiment described above regarding the network camera, video data may be streamed from the network camera 18 to the vehicle 12 via location-based device 90. In other embodiments, numerous cameras may simultaneously record and send video data to the vehicle via location-based device 90. The method 400 then ends.

With reference to FIG. 5, there is shown an embodiment of a method 500 of wireless communication between a location-based wireless communications device and a vehicle. Generally, method 500 includes detecting of a triggering event, establishing a multi-Gbps capable SRWC connection with a vehicle, receiving data at the location-based wireless communications device from the vehicle via the SRWC connection, storing the data on a memory device of the location-based device, and transmitting the data to a network access device, a network computing device, or a remote server using a communication link. It should be appreciated that the communication link between the location-based device 90 and the network access device 16 or network computing device 18 may be established before method 500 or during any one or more steps 510 to 540.

In one scenario, one or more users may play media content using one or more vehicle user interfaces at vehicle 12 and, upon the vehicle arriving at location 14, the users may desire to continuing playing the media content at a network computing device 18 (e.g., a smart TV) at location 14. In another scenario, when the vehicle arrives at location 14, information regarding the vehicle's trip or other information may be sent to and/or stored at a remote server, such as a server at remote facility 80 or a computer 78. In either scenario, and in many other scenarios, method 500 enables wireless communications as to provide such desired functionality.

Method 500 beings with step 510, wherein a vehicle is detected to be within an operating range of the location-based wireless communications device. In other embodiments, other triggering events may be used in place of the vehicle detection or in addition to the vehicle detection. This step is analogous to step 310 of method 300 and step 430 of method 400 and, accordingly, any one or more embodiments described above in step 310 and/or step 430 may be used here in step 510. The method 500 continues to step 520.

In step 520, a short-range wireless communication (SRWC) connection between the location-based wireless communications device and the vehicle is established. This step is analogous to step 320 of method 300 and step 440 of method 400 described above and, accordingly, any one or more embodiments described above in step 320 and/or step 440 may be used here in step 520. In many embodiments, the SRWC connection may be carried out over at least a first frequency band that enables a multi-Gbps data transfer rate, such as IEEE 802.11ad. The method 500 continues to step 530.

In step 530, the data is received at the location-based wireless communications device from the vehicle via the SRWC connection. In one embodiment, when the vehicle arrives at location 14, which can be detected in step 510, media content may be sent to the location-based device 90. In another embodiment, vehicle or trip information may be sent to the location-based device 90 from the vehicle 12 via the SRWC connection. In some embodiments, location-based device 90 may permit the data to be transferred at a multi-Gbps speed, which can reduce the time the vehicle must supply power to the wireless communications device. The method 500 continues to step 540.

In step 540, the received data is stored in a memory device of the location-based wireless communications device. This step is analogous to step 420 of method 400 described above and, accordingly, any one or more embodiments described above in step 420 may be used here in step 540. For example, the media content or other data received in step 530 may be stored on memory device 96 of location-based device 90. The method 500 continues to step 550.

In step 550, the data is sent from the location-based wireless communications device to the network computing device using a communication link. The communication link may be a wired communication link, such as an Ethernet connection, or a wireless communication link, such as a SRWC connection. In some embodiments, the network computing device may be a smart television, a dongle, a desktop computer, a laptop computer, a smartphone, or a tablet. In such an embodiment, the data may be media content that may be viewed or presented at the network computing device 18.

In other embodiments, the data is sent to the network access device 16, which can be connected to one or more remote networks. The network access device 16 may be configured to send the data to a remote server. The data may be processed by processor 94 and a remote server message including at least part of the data may be sent to a remote server via the network access device. The remote server message may include a network address, such as an Internet Protocol (IP) address or a domain name that is associated with a remote server. The domain name may be resolvable to an IP address by a domain name system (DNS) server. For example, when vehicle 12 arrives at location 14, vehicle information or trip information may be sent to a remote server via location-based device 90.

In another embodiment, the location-based device 90 may periodically communicate with the vehicle 12 via the SRWC connection. The location-based device 90 may send a message to a mobile device or a remote server, such as a server at remote facility 80 or computer 78, when it is detected that the vehicle is no longer in an operating range of the location-based device 90. This detection may be based on an unexpected termination of the periodic communications by a remote server and, upon this detection, the remote facility may generate a message indicating that the vehicle is no longer detected to be at location 14. The generated message may be sent to mobile device 82, network computing device 18, or other device that may provide a user or operator of the vehicle a message indicating that the vehicle is no longer detected to be at the location 14. The method 500 ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive or. As an example, the phrase "A, B, and/or C" includes: "A"; "B"; "C"; "A and B"; "A and C"; "B and C"; and "A, B, and C."

The invention claimed is:

1. A method of wireless communication between a location-based wireless communications device and a vehicle, the method comprising the steps of:
    detecting at the location-based wireless communications device located external to the vehicle, a triggering event associated with one or more vehicle-related functions;
    in response to the triggering event, establishing a short-range wireless communication (SRWC) connection between the location-based wireless communications device and the vehicle, wherein the SRWC connection is carried out over at least a first frequency band that enables a multi-Gbps data transfer rate; and
    selectively transferring data between the location-based wireless communications device and the vehicle over the SRWC connection including transmitting to the vehicle data received at the location-based wireless communications device from at least one of a network computing device and a remote server.

2. The method of claim 1, further including the step of communicating the data between the location-based wireless communications device and the network computing device over a communication link, wherein the communication link is configured to operate over at least a second frequency band.

3. The method of claim 2, wherein the communicating step includes receiving the data at the location-based wireless communications device from the remote server via the network computing device using the communication link.

4. The method of claim 3, wherein the transferring step is carried out after the data is received at the location-based wireless communications device and after the vehicle is detected to be within an operating range of the location-based wireless communications device.

5. The method of claim 4, further comprising the step of storing the data at a memory device included in the location-based wireless communications device after the data is received from the remote server via the network computing device.

6. The method of claim 5, wherein the transferring step includes:
recalling the data from the memory device included in the location-based wireless communications device; and
sending the data to the vehicle using the SRWC connection.

7. The method of claim 6, wherein the data is an over-the-air (OTA) update for a vehicle system module or media content that is to be presented at one or more vehicle-user interfaces.

8. The method of claim 2, wherein the communication link uses short-range wireless communications (SRWC).

9. The method of claim 2, wherein the communication link uses a wired communication link.

10. The method of claim 2, wherein the transmitting step includes sending the data from the location-based wireless communications device to the network computing device using the communication link.

11. The method of claim 2, wherein the network computing device is a smart television, a dongle, a desktop computer, a laptop computer, a smartphone, or a tablet.

12. The method of claim 1, wherein the transferring step includes receiving the data at the location-based wireless communications device from the vehicle via the SRWC connection.

13. The method of claim 12, further comprising the step of storing the data in a memory device of the location-based wireless communications device.

14. The method of claim 12, wherein the network computing device is a network access device, and wherein the network access device is configured to send the data to the remote server.

15. The method of claim 14, wherein the data is included in a remote server message, wherein the remote server message includes an Internet Protocol (IP) address or a domain name of the remote server, wherein the domain name is resolvable to an IP address by a domain name system (DNS) server.

16. The method of claim 1, wherein the data indicates a presence of the vehicle at a location that includes the location-based wireless communications device.

17. The method of claim 16, wherein the remote server is configured to send a message to the network computing device associated with a user of the vehicle when the vehicle is no longer detected to be within the operating range of the location-based wireless communications device.

18. The method of claim 17, wherein the network computing device associated with the user of the vehicle is a smart television, a dongle, a desktop computer, a laptop computer, a smartphone, or a tablet.

19. The method of claim 1, wherein the first frequency band includes one or more wireless communication channels, wherein each of the one or more wireless communication channels includes a center frequency between 35 GHz and 100 GHz.

20. The method of claim 19, wherein the first frequency band includes IEEE 802.11ad, IEEE 802.11aj, IEEE 802.11ay, or IEEE 802.11az.

21. The method of claim 1, further comprising the step of receiving the data at the location-based wireless communications device from at least one camera, wherein the at least one camera is connected to the location-based wireless communications device using a communication link that operates over at least a second frequency band.

22. The method of claim 1, wherein the detecting step includes receiving a short-range wireless communication (SRWC) signal from a vehicle communications module installed on the vehicle.

23. A method of wireless communication between a location-based wireless communications device and a vehicle, the method comprising the steps of:
establishing a first short-range wireless communication (SRWC) connection between the vehicle and the location-based wireless communications device located external to the vehicle, wherein the first SRWC connection is configured to operate over at least a first frequency band that enables a multi-Gbps data transfer rate; and
selectively transferring data between the location-based wireless communications device and the vehicle over the first SRWC connection upon detection of a triggering event, wherein the triggering event is associated with one or more vehicle functions that includes the transfer of data between the location-based wireless communications device and the vehicle.

24. A system for wireless communication to a vehicle, the system comprising:
a location-based wireless communications device located external to the vehicle configured to:
detect when the vehicle is within an operating range of the location-based wireless communications device;
establish a first short range wireless communication (SRWC) communication link to the vehicle, wherein the first SRWC communication link is configured to operate over at least a first frequency band that enables a multi-Gbps data transfer rate; and
selectively transfer data over the first SRWC communication link including transmitting to the vehicle data received at the location-based wireless communications device from at least one of a network computing device and a remote server.

* * * * *